United States Patent
Burgess

(10) Patent No.: US 9,818,450 B2
(45) Date of Patent: Nov. 14, 2017

(54) SYSTEM AND METHOD OF SUBTITLING BY DIVIDING SCRIPT TEXT INTO TWO LANGUAGES

(71) Applicant: Sony Interactive Entertainment Europe Limited, London (GB)

(72) Inventor: Christopher Burgess, London (GB)

(73) Assignee: Sony Interactive Entertainment Europe Limited (GB)

(*) Notice: Subject to any disclaimer, the term of this patent is extended or adjusted under 35 U.S.C. 154(b) by 210 days.

(21) Appl. No.: 14/674,628

(22) Filed: Mar. 31, 2015

(65) Prior Publication Data

US 2016/0295132 A1 Oct. 6, 2016

(51) Int. Cl.
- *H04N 5/278* (2006.01)
- *H04N 5/44* (2011.01)
- *G11B 27/28* (2006.01)
- *G11B 27/10* (2006.01)

(52) U.S. Cl.
CPC ............ *G11B 27/28* (2013.01); *G11B 27/10* (2013.01)

(58) Field of Classification Search
CPC .................... H04N 5/278; H04N 5/4401
See application file for complete search history.

(56) References Cited

U.S. PATENT DOCUMENTS

| | | | | |
|---|---|---|---|---|
| 6,067,514 A | * | 5/2000 | Chen | G10L 15/18 704/235 |
| 9,396,666 B2 | * | 7/2016 | Louwerse | G09B 7/04 |
| 2006/0074690 A1 | * | 4/2006 | Xu | G10L 21/06 704/276 |

OTHER PUBLICATIONS

Burgess, Chris, "LAMS: Building a Localization Tool for Everybody", Presentation, Game Developers Conference, Localization Summit, Mar. 17, 2014, 77 pages.

Burgess, Chris, GDC Vault, "LAMS: Building a Localized Tool for Everybody", Localization Summit, LAMS presentation Mar. 17, 2014, retrieved from <http://www.gdcvault.com/play/1020490/LAMS-Building-a-Localization-Tool>, retrieved on Apr. 1, 2015, 6 pages.

* cited by examiner

Primary Examiner — Qian Yang
(74) Attorney, Agent, or Firm — Lerner, David, Littenberg, Krumholz & Mentlik, LLP

(57) ABSTRACT

A method of subtitling comprises the steps of obtaining an audio file of dialogue in a first language, obtaining a file of script text corresponding to the dialogue in the audio file in the same first language, determining a timing correspondence between dialogue in the audio file and words in the script text, detecting at least a first pause during performance of the dialogue in the audio file, defining a respective breakable point in the script text corresponding to the or each detected pause, and dividing the script text out into a sequence of subtitle lines of text responsive to the location of one or more of the defined breakable points.

12 Claims, 6 Drawing Sheets

| Start | Stop | Subtitle | |
|-------|------|----------|---|
| 100 | 1500 | Name's Nightcrawler. | 62 |
| 1600 | 2600 | Diggs Nightcrawler. | 64 |
| 3000 | 4000 | I'm a private detective. | 66 |

*Figure 4*

| Start | Stop | Subtitle | |
|-------|------|----------|---|
| 100 | 2600 | Name's Nightcrawler. Diggs Nightcrawler. | 72 |
| 3000 | 4000 | I'm a private detective. | 74 |

*Figure 5*

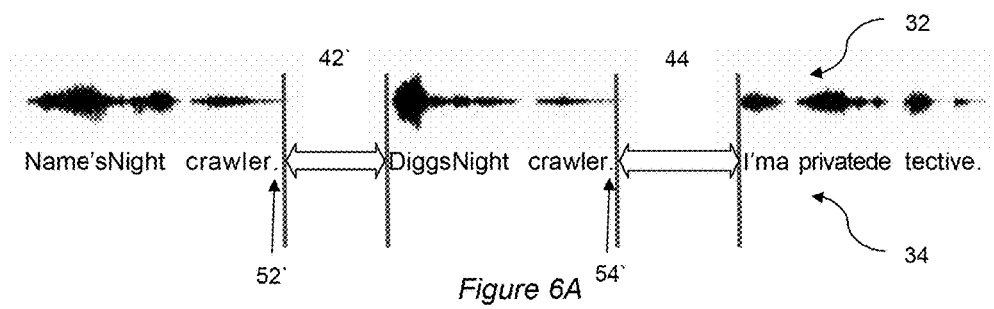
*Figure 6A*
| Start | Stop | Subtitle | |
|-------|------|----------|---|
| 100 | 1500 | Name's Nightcrawler. | 62˙ |
| 2000 | 3000 | Diggs Nightcrawler. | 64˙ |
| 3600 | 4600 | I'm a private detective. | 66˙ |
*Figure 6B*
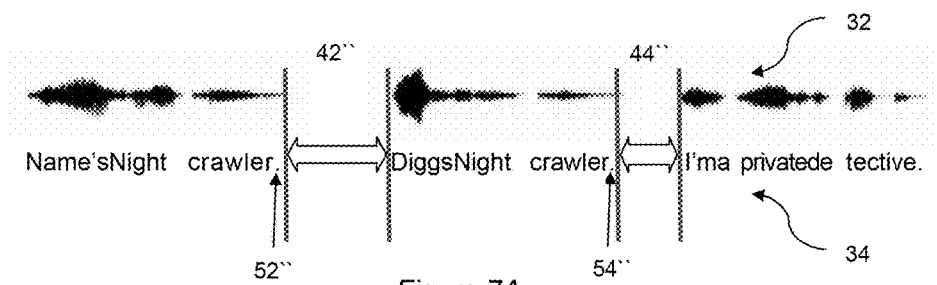
*Figure 7A*
| Start | Stop | Subtitle | |
|-------|------|----------|---|
| 100 | 1500 | Name's Nightcrawler. | 72˙ |
| 2000 | 4000 | Diggs Nightcrawler. I'm a private detective. | 74˙ |
*Figure 7B*

SYSTEM AND METHOD OF SUBTITLING BY DIVIDING SCRIPT TEXT INTO TWO LANGUAGES

BACKGROUND OF THE INVENTION

Field of the Invention

The present invention relates to a system and method of subtitling.

Description of the Prior Art

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly or impliedly admitted as prior art against the present invention.

In the film industry, a film typically provides a linear narrative over the course of 2 or 3 hours, following the action and dialogue laid out in a script. During editing, specific shots and specific performances of dialogue are selected by the director.

The result is a film in which each line of dialogue has a predetermined start and end point within the course of the film.

The director can also decide how subtitles will be presented to viewers of the film for whom a dubbed language is not available; a translation of the script into such a language can be provided, and the director can provide artistic input into the timing, breakup and placement of subtitles to convey both the information and emotional tone of the film as they see fit.

By contrast, in the video game industry a game typically provides an environment within which a user follows a loose narrative at a pace of their own choosing whilst exploring other environmental features or following a potentially large number of secondary narratives in parallel. The effective duration of the game may be in the order of 30 or 40 hours, and the order in which action and dialogue are presented is in large part a consequence of the users actions.

Consequently there is typically a much larger amount of dialogue within a videogame than within a film, and the dialogue is typically presented in response to user driven events rather than being part of a linear film under the direct supervision of a director.

Furthermore, particularly in modern games where there is an expectation that the game world is as richly complex as the real world, it is often necessary to provide a large number of variations of dialogue for the same 'scene' so that a user does not become conscious of dialogue repetition when revisiting a key character many times (such as a shopkeeper), or individually encountering a number of non-player characters of a similar class (such as guards).

The result is that the script and corresponding recorded dialogue for a videogame is much larger than for a film, highly fragmented and typically event driven.

Consequently, generating subtitles in another language for the recorded dialogue can be arduous, and because much of the dialogue is only presented in response to specific events, rather than simply being part of a linear playback, it can be extremely burdensome to validate the presentation of the subtitles for each line of dialogue in each supported language.

The present invention seeks to mitigate or alleviate the above problem.

SUMMARY OF THE INVENTION

The foregoing paragraphs have been provided by way of general introduction, and are not intended to limit the scope of the following claims. The described embodiments, together with further advantages, will be best understood by reference to the following detailed description taken in conjunction with the accompanying drawings.

In a first aspect, a method of subtitling is provided in accordance with claim 1.

In another aspect, a subtitle generating apparatus is provided in accordance with claim 9.

In another aspect, a tangible non-transitory computer program product is provided in accordance with claim 14.

Further respective aspects and features of the invention are defined in the appended claims.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein:

FIG. 4 is a table of subtitles in accordance with an embodiment of the present invention.

FIG. 5 is a table of subtitles in accordance with an embodiment of the present invention.

FIG. 6A is a schematic diagram of audio and script text in accordance with an embodiment of the present invention.

FIG. 6B is a table of subtitles in accordance with an embodiment of the present invention.

FIG. 7A is a schematic diagram of audio and script text in accordance with an embodiment of the present invention.

FIG. 7B is a table of subtitles in accordance with an embodiment of the present invention.

DESCRIPTION OF THE EMBODIMENTS

A system and method of subtitling are disclosed. In the following description, a number of specific details are presented in order to provide a thorough understanding of the embodiments of the present invention. It will be apparent, however, to a person skilled in the art that these specific details need not be employed to practice the present invention. Conversely, specific details known to the person skilled in the art are omitted for the purposes of clarity where appropriate.

In an embodiment of the present invention, a so-called localisation tool is provided that comprises means for associating sections of script text and corresponding sections of audio to each other, and to event or trigger identifiers associated with the game. In this way, a game may be coded to request a particular section of audio in response to a particular event or trigger within the game, such as when first greeting a new character, or reaching a particular node on a dialogue tree for that character. In this case each node may have its own identifier and associated audio.

The specifics of how these associations are managed, and optionally how version control is managed where these sections of script or audio may be edited or rerecorded, fall outside the remit of the present description; but will be understood by the person skilled in the art.

For a first language, such as for example English, audio files of recorded dialogue and corresponding files comprising script text for a given dialogue node will be available within the system of the localisation tool.

Figure 1:
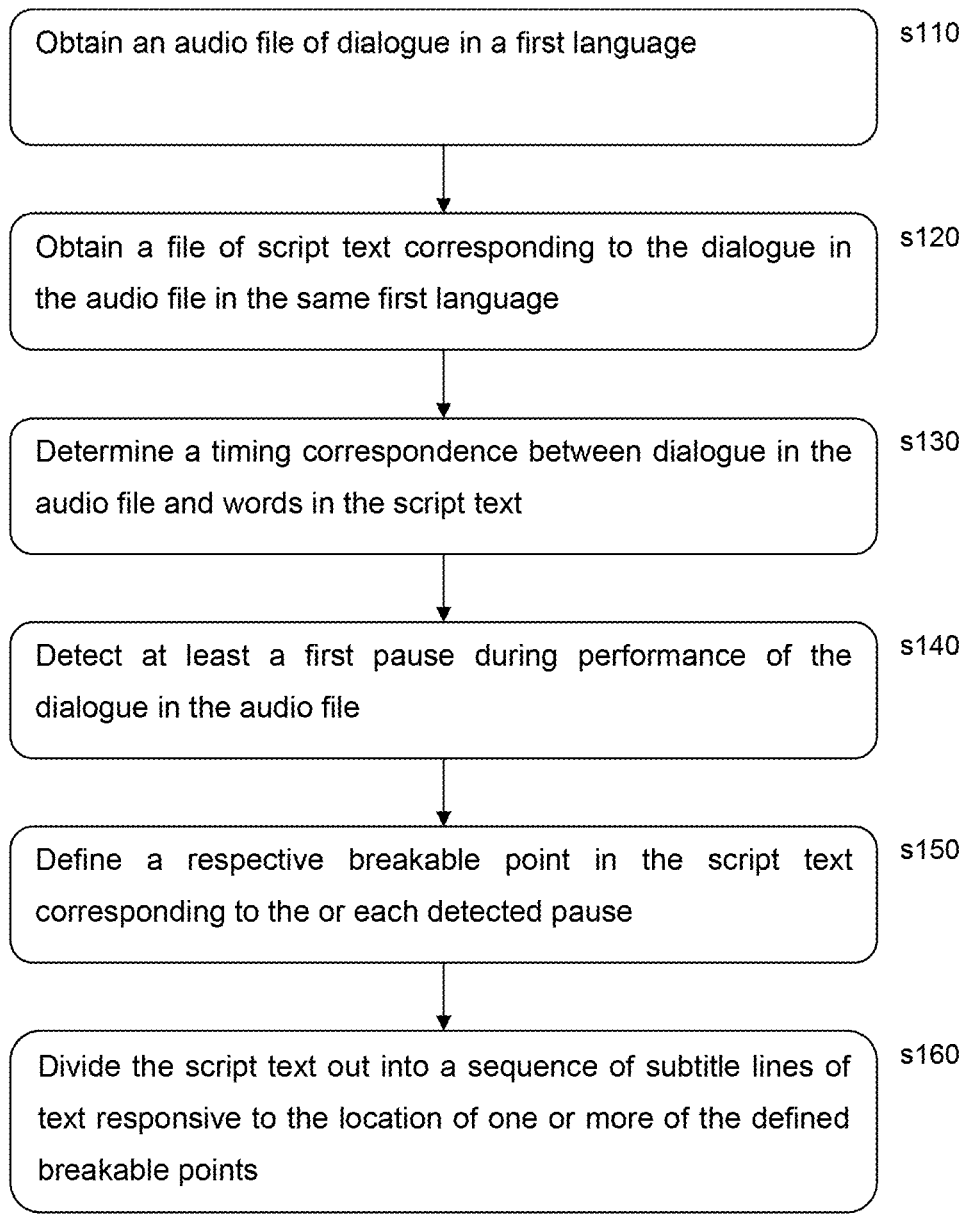
FIG. 1 is a flow diagram of a method of subtitling in accordance with an embodiment of the present invention.

Referring now to FIG. 1, in an embodiment of the present invention, a method of automated subtitling, for a given dialogue node, comprises a first step s110 of obtaining an audio file of dialogue in the first language. Next in a second step s120, a file of script text is obtained that corresponds to the dialogue in the audio file in the same first language. As noted above, typically the audio file and the script text file will share an association within the localisation tool.

Figure 2:
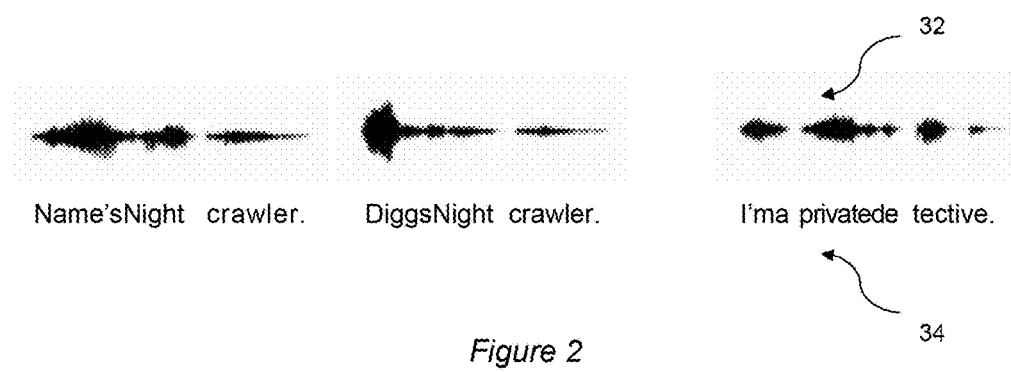
FIG. 2 is a schematic diagram of audio and script text in accordance with an embodiment of the present invention.

Referring now also to FIG. 2, in a third step s130, a timing correspondence is determined between dialogue in the audio file (32) and words in the script text (34). In the figure, this is illustrated by the spacing/position of the letters in the script text "Name's Nightcrawler. Diggs Nightcrawler. I'm a private detective." with respect to a graphical representation of the audio.

In an embodiment of the present invention, the correspondence is based upon a simple speech recognition scheme. For example, this scheme may seek to correlate a sequence of detected phonemes in the recorded dialogue to those that may be generated by performing the script, thereby identifying at what times within the recorded dialogue components of the script are uttered.

Because the speech recognition is not for the purposes of transcription, precise phoneme accuracy is not important. For example, detection of /b/, /p/ or /d/ phonemes may be treated as equivalent. Nevertheless this level of accuracy is sufficient to track the timing/cadence of the performance of the script within the recorded audio.

Indeed, in an embodiment of the present invention, recognition of specific phonemes is not required, and the scheme may seek to correlate a sequence of detected voiced and unvoiced components of the recorded dialogue to those that may be generated by performing the script (for example the generated pattern of vowels and fricatives).

Figure 3:
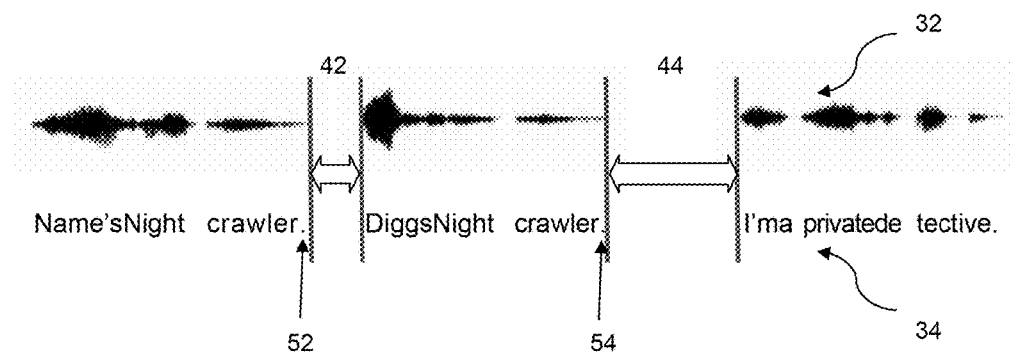
FIG. 3 is a schematic diagram of audio and script text in accordance with an embodiment of the present invention.

Referring now also to FIG. 3, in a fourth step s140 at least a first pause (42, 44) is detected during performance of the dialogue in the audio file. In an embodiment of the present invention, a pause may be defined as a portion of the audio recording in which signal levels are below a first predetermined signal level threshold, for a period of time longer than a first predetermined duration threshold. In other words, a portion of the audio which is substantially silent for a predetermined period of time. The first predetermined duration threshold is set to distinguish incidental pauses within and between words, from intentional pauses that may reflect a comma or full stop in the script, or result from dramatic interpretation within a performance.

Referring again to FIG. 3, in a fifth step s150, a respective breakable point (52, 54) is defined in the script text, corresponding to the or each detected pause. Typically this breakable point occurs after the last character in the word immediately preceding the start of a detected pause, or where present, a grammatical character following that word, such as a comma, full stop, question mark, exclamation mark or quotation mark. Where a series such marks are present (for example multiple exclamation marks, or the end of a quoted question), then the breakable point occurs at the end of the series. Hence typically the breakable point occurs at a space or hyphen in the script text corresponding to the start of the detected pause.

Referring now also to FIG. 4, in a sixth step s160, the script text 34 is divided out into a sequence of subtitle lines of text (62, 64, 66) responsive to the location of one or more of the defined breakable points.

In an embodiment of the present invention, each subtitle in the subtitle sequence is associated with a start and stop time (for example in milliseconds) corresponding to the beginning and end of the performed dialogue corresponding to the specific text in that subtitle. The timings associated with the detected pauses discussed previously may be used for this purpose, with similarly detected additional timings for the start of the first utterance and the end of the last utterance in the recorded dialogue.

The division of the script text responsive to the breakable points may take several forms.

In one embodiment, the script text is divided out at each identified breakable point, as illustrated in FIG. 4.

In another embodiment, the division also takes account of how wide a subtitle can be on-screen. Accordingly, a maximum length N for a line of subtitle text is set (this in turn may vary as a function of specified font/font size, game resolution or character set).

In this case, the remaining script text can be divided at the last breakable point in the remaining script text whose position precedes the position in the remaining script text equal to the maximum length of line of subtitle text. In other words, starting at the beginning of the script text (or at the beginning of the remaining script text following one or more previous divisions), the localisation tool detects the breakable point closest to and preceding the Nth character in the remaining script text.

Referring to FIG. 5, if, as a non-limiting example, the maximum length N for a line of subtitle text is 45 characters, then in principle a single subtitle could read: "Name's Nightcrawler. Diggs Nightcrawler. I'm", followed by the remaining text "a private detective." as a subsequent subtitle at the appropriate moment.

However, this division of the text would look strange to the user. Consequently, the breakable point closest to and preceding the Nth character in the remaining script text (at the full stop corresponding to reference numeral 54) is selected instead, resulting in the division of subtitles seen in FIG. 5. It will be appreciated therefore that if there were several breakable points preceding the Nth character, the remaining script text will only be divided out at the last breakable point preceding the nth character.

In an embodiment of the present invention, the step of detecting at least a first pause also comprises classifying the pause as a short pause or a long pause according to whether the pause exceeds a predetermined threshold duration. For example, if a pause is more than 50 ms and less than 250 ms, it may be classified as a short pause, whereas if the pause is more than 250 ms, it may be classified as a long pause. The actual values of the thresholds may be at the discretion of the developer, and may be character- or actor-specific, reflecting the different speed of delivery of dialog by some actors or characters. Hence the minimum threshold for any pause may for example be in the range 20-250 ms, whilst the upper threshold for a short pause may for example be in the range 150 ms-750 ms, assuming this upper threshold is larger than the minimum threshold in a particular implementation.

Given the above classification, the localisation tool may then define a breakable point in the script text as being where a pause is classified as a short pause, and defining a break point in the script text as being where a pause is classified as a long pause.

A breakable point, as described above, may be used to divide the script text into subtitles, or may be treated as one of several indicators of where a script text can be divided, which is then subject to the additional condition that it is the last such indicated point before the Nth character in the remaining undivided portion of the script text.

By contrast a break point, corresponding to a longer pause, may be used to modify this approach by overriding the additional condition that it is the last indicated point before the Nth character in the remaining undivided portion of the script text.

In other words, where a sufficiently long pause is encountered, the remaining script text preceding it is divided out into a new subtitle even if there was space in the current subtitle to accommodate another section of text before the last breakable point preceding the Nth character on that subtitle line.

Hence, for example, whilst implementing the rules giving rise to the subtitling seen in FIG. 5, as described previously, if a new recording of the dialogue was received in which the first pause 42' was longer as shown in FIG. 6A, it would be classified as long pause, and both pauses would define break points 52', 54' resulting in the subtitle sequence 62', 64', 66' shown in FIG. 6B.

However, if another new recording of the dialogue was received in which the first pause 42" was still long but the second pause 44" became short, as shown in FIG. 7A, it would result in the subtitle sequence 72', 74' shown in FIG. 7B, because the second pause is now classified only as a breakable point. In this example, the remainder of the script text following the first break point 52" is less than N characters and hence the breakable point 54" corresponding to the shorter pause 44" is not used to divide the script text into an additional subtitle.

As has been noted previously herein, when a subtitle is divided out from the script text corresponding to the current audio recording, a respective timing is defined for the second and any subsequent subtitle line with respect to the start of the dialogue in the audio file based upon the timing of the or each pause corresponding to the or each division of the script text. Meanwhile the start and end timings are based upon the detected start of the first utterance and the detected end of the last utterance.

Where two characters interact in a conversation and this is recorded separately for each actor, their respective recordings may be analysed in parallel. In this case, each individual recording may contain long pauses, but when added together, these long pauses are occupied at least in part by dialog from the other character.

Hence for example, any of the above discussions, the dialogue and recordings for the script text "Name's Nightcrawler. Diggs Nightcrawler. I'm a private detective." may in fact refer to the combined analysis of two separate recordings, comprising: "Name's Nightcrawler . . . . I'm a private detective." and "Diggs Nightcrawler.", representing a second character interjecting to confirm the full name of the first. In this, case, subtitle text may be colour coded by character, for example. Optionally, a switch between characters may be treated as a break point irrespective of the pause duration within the combined analysis, if the designer of the game wants separation between characters. However even in this case, within each character utterance the previously discussed techniques may be applied to further divide the text into subtitles.

It will be appreciated that the above techniques may be used each time a piece of recorded dialogue and corresponding script text is added to, or updated in, the localisation system. Appreciated that the above techniques may be used not just for English but any language for which audio recordings and script text are available.

However it will be appreciated that when localising a game for broad distribution, it may be preferable to limit costs by providing audio dialogue in a first language with additional subtitles in a different, second language, rather than recording the audio dialogue in that second language.

Figure 8:
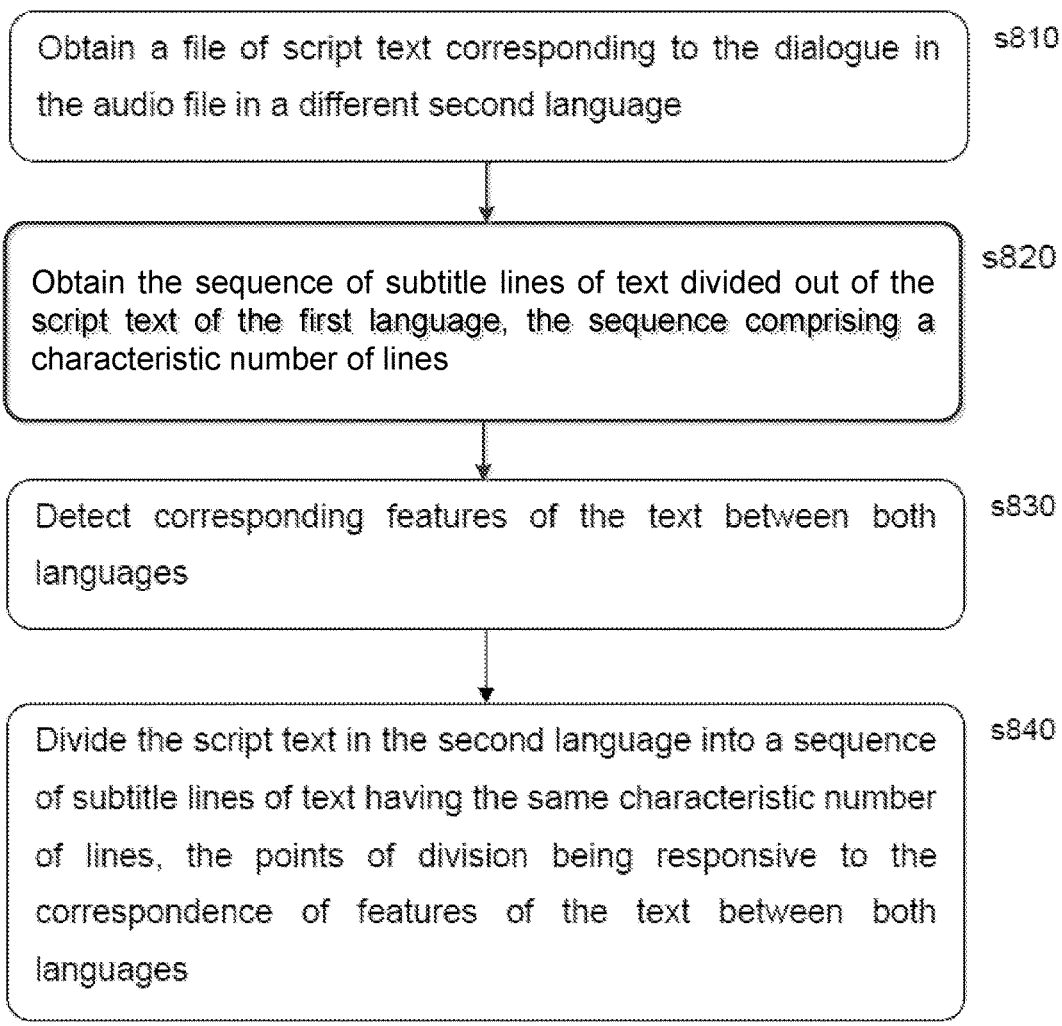
FIG. 8 is a flow diagram of a method of subtitling in accordance with an embodiment of the present invention.

Referring now to FIG. 8, a method of doing this comprises a first step s810 of obtaining a file of script text in a different second language corresponding to the dialogue in the audio file of the first language.

In the present example the script text may read "Nightcrawler de nom. Diggs Nightcrawler. Je suis un détective privé." in French, or "░░░░ ░░░░. ░░░ ░░░░░░. ░░ ░░░░░░." in Korean, corresponding to the spoken dialog "Name's Nightcrawler. Diggs Nightcrawler. I'm a private detective.".

In a second step s820, the sequence of subtitle lines of text divided out of the script text of the first language is obtained, the sequence comprising a characteristic number of lines. This is the sequence of subtitles generated using the previously described techniques in the same language as that of the audio. The sequence comprises a number of lines of subtitles characteristic of the pauses and length of dialogue and the division rules used to split up the script text. In the examples of FIGS. 4, 5, 6B and 7B number of lines of subtitles are variously 2 or 3, with the script text divided between them in various ways.

In a third step s830, corresponding features of the text between both languages are detected. In particular equivalent punctuation marks may be detected, as may proper nouns such as 'Diggs' and 'Nightcrawler'. In addition, whilst the translation is likely to have been done by a professional translator, optionally a machine translation of the second language back into the first language may be used to identify a number of word-for-word correlations between them.

In a fourth step s840, the script text in the second language is divided into a sequence of subtitle lines of text having the same characteristic number of lines as those of the subtitles in the first language, the points of division being responsive to the correspondence of features of the text between both languages.

Many defined breaks and breakable points in the first language script, giving rise to the first language subtitles, will correspond to punctuation marks such as commas, semi-colons, exclamation marks, question marks, quotes and full stops. Consequently to a first approximation the second language script text can be divided at points of where the punctuation corresponds to punctuation at the end of each subtitle line.

Where a subtitle in the first language doesn't end with punctuation (for example because of a dramatic pause in the actor's performance that does not correspond to a scripted pause), the localisation tool can count the number of words in that subtitle and divide the second language script text after the same number of words. Alternatively or in addition, the localisation tool can identify proper nouns within both language texts, and split the second language script text so that at least minimum threshold proportion of these proper nouns occur in the same line of second language subtitle text as in the first language subtitle text, subject to a maximum length value for the subtitle line of the second language text, such as for example 150% of the length of the first language subtitle line. Once the first language subtitles end with punctuation marks again, the previous punctuation based division method can be used.

In this way, second language subtitles can be automatically generated for first language audio by correlating textual features of the second language script text to textual features of automatically generated first language subtitles.

Figure 9:
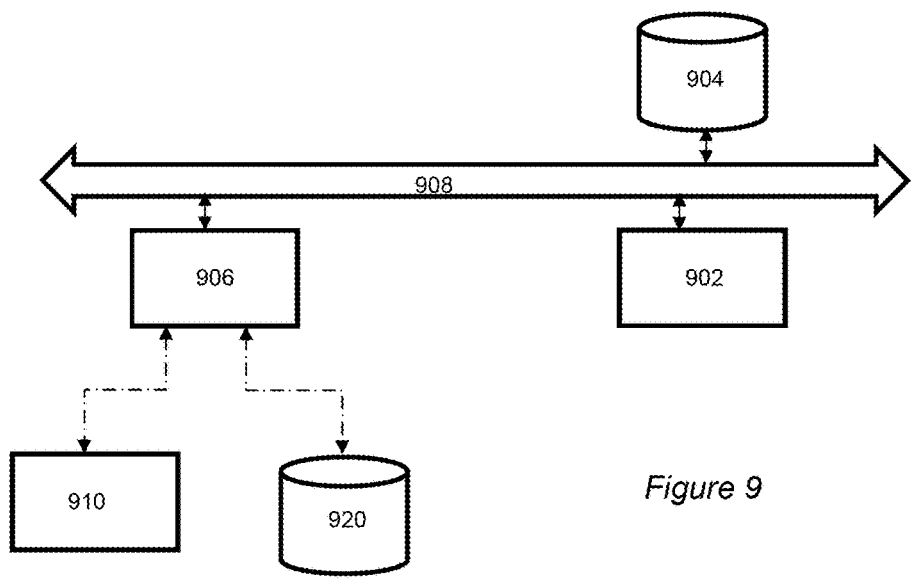
FIG. 9 is a schematic diagram of a computer in accordance with an embodiment of the present invention.

Referring now to FIG. 9, localisation tool itself may be a PC, server, or console development kit, or may be distributed across a combination of such devices. In an embodiment of the present invention the localisation tool is a general-purpose computer 900 comprising at least one processor 902, storage means (non-volatile and/or volatile) 904, a input/output interface 906, and a bus 908 connecting the processor 902, I/O interface 906 and storage means 904. The I/O interface 906 is adapted to connect to user input devices 910, such as a keyboard and mouse, or to client devices in a server configuration. Optionally it may also connect to audio inputs for the purposes of recording the spoken dialogue discussed previously herein. The I/O interface 906 may also be adapted to connect to remote storage means 920, for example connected by the Internet, to access localisation data such as audio and translated script text from overseas.

It will therefore be appreciated that the above described methods may be carried out on conventional hardware suitably adapted as applicable by software instruction or by the inclusion or substitution of dedicated hardware.

Thus the required adaptation to existing parts of a conventional equivalent device may be implemented in the form of a computer program product comprising processor implementable instructions stored on a tangible non-transitory machine-readable medium such as a floppy disk, optical disk, hard disk, PROM, RAM, flash memory or any combination of these or other storage media, or realised in hardware as an ASIC (application specific integrated circuit) or an FPGA (field programmable gate array) or other configurable circuit suitable to use in adapting the conventional equivalent device. Separately, such a computer program may be transmitted via data signals on a network such as an Ethernet, a wireless network, the Internet, or any combination of these of other networks.

Accordingly, under suitable software instruction, a general-purpose computer may act as a localisation tool, and more specifically as a subtitle generating apparatus, comprising one or more computer processors (902), adapted to obtain an audio file of dialogue in a first language, obtain a file of script text corresponding to the dialogue in the audio file in the same first language, determine a timing correspondence between dialogue in the audio file and words in the script text, detect at least a first pause during performance of the dialogue in the audio file, define a respective breakable point in the script text corresponding to the or each detected pause, and divide the script text out into a sequence of subtitle lines of text responsive to the location of one or more of the defined breakable points, as described previously.

It will also be appreciated that such an apparatus may implement the other techniques described herein, including but not limited to in a first case, setting a maximum length for a line of subtitle text, and dividing the remaining script text at the last breakable point in the remaining script text whose position precedes the position in the remaining script text equal to the maximum length of line of subtitle text. In a second case, classifying the pause as a short pause or a long pause according to whether the pause exceeds a predetermined threshold duration, defining a breakable point where a pause is classified as a short pause, and defining a break point where a pause is classified as a long pause, and dividing the remaining script text at the next break point in the remaining script text. In a third case, obtaining a file of script text corresponding to the dialogue in the audio file in a different second language, obtaining the sequence of subtitle lines of text divided out of the script text of the first language, (the sequence comprising a characteristic number of lines), detecting corresponding features of the text between both languages, and dividing the script text in the second language into a sequence of subtitle lines of text having the same characteristic number of lines, the points of division being responsive to the correspondence of features of the text between both languages. Corresponding features may be detected by detecting punctuation at the end of subtitle lines of text in the first language within the script text in the second language.

Thus, the foregoing discussion discloses and describes merely exemplary embodiments of the present invention. As will be understood by those skilled in the art, the present invention may be embodied in other specific forms without departing from the spirit or essential characteristics thereof. Accordingly, the disclosure of the present invention is intended to be illustrative, but not limiting of the scope of the invention, as well as other claims. The disclosure, including any readily discernible variants of the teachings herein, defines, in part, the scope of the foregoing claim terminology such that no inventive subject matter is dedicated to the public.

The invention claimed is:

1. A method of subtitling, comprising the steps of:
   obtaining an audio file of dialogue in a first language;
   obtaining a file of script text corresponding to the dialogue in the audio file in the same first language;
   determining, by one or more processors of a computing device, a timing correspondence between dialogue in the audio file and words in the script text;
   detecting at least a first pause during performance of the dialogue in the audio file;
   defining, by the one or more processors, a respective breakable point in the script text corresponding to the or each detected pause;
   dividing, by the one or more processors, the script text out into a sequence of subtitle lines of text responsive to the location of one or more of the defined breakable points;
   obtaining a file of script text corresponding to the dialogue in the audio file in a different second language;
   obtaining the sequence of subtitle lines of text divided out of the script text of the first language, the sequence comprising a characteristic number of lines;
   detecting, by the one or more processors corresponding features of the text between both languages;
   dividing, by the one or more processors, the script text in the second language into a sequence of subtitle lines of text having the same characteristic number of lines, the points of division being responsive to the correspondence of features of the text between both languages; and
   outputting the sequence of subtitle lines of text for presentation on a display device.

2. A method of subtitling according to claim 1, comprising the step of:
   setting a maximum length for a line of subtitle text;
   and wherein the step of dividing the script text out into a sequence of subtitles comprises:
   dividing the remaining script text at the last breakable point in the remaining script text whose position precedes the position in the remaining script text equal to the maximum length of line of subtitle text.

3. A method of subtitling according to claim 1, in which the step of detecting at least a first pause comprises the step of:
classifying the pause as a short pause or a long pause according to whether the pause exceeds a predetermined threshold duration.

4. A method of subtitling according to claim 3, in which the step of defining a respective breakable point comprises the step of:
defining a breakable point where a pause is classified as a short pause, and defining a break point where a pause is classified as a long pause.

5. A method of subtitling according to claim 4 which the step of dividing the script text out into a sequence of subtitles comprises:
dividing the remaining script text at the next break point in the remaining script text.

6. A method of subtitling according to claim 1, comprising the step of:
defining a respective timing for the second and any subsequent subtitle line with respect to the start of the dialogue in the audio file based upon the timing of the or each pause corresponding to the or each division of the script text.

7. A method of subtitling according to claim 1, in which the step of detecting corresponding features comprises detecting punctuation at the end of subtitle lines of text in the first language within the script text in the second language.

8. A subtitle generating apparatus, comprising:
one or more computer processors, adapted to:
obtain an audio file of dialogue in a first language;
obtain a file of script text corresponding to the dialogue in the audio file in the same first language;
determine a timing correspondence between dialogue in the audio file and words in the script text;
detect at least a first pause during performance of the dialogue in the audio file;
define a respective breakable point in the script text corresponding to the or each detected pause;
divide the script text out into a sequence of subtitle lines of text responsive to the location of one or more of the defined breakable points;
obtain a file of script text corresponding to the dialogue in the audio file in a different second language;
obtain the sequence of subtitle lines of text divided out of the script text of the first language, the sequence comprising a characteristic number of lines;
detect corresponding features of the text between both languages;
divide the script text in the second language into a sequence of subtitle lines of text having the same characteristic number of lines, the points of division being responsive to the correspondence of features of the text between both languages
output the sequence of subtitle lines of text for presentation on a display device.

9. The subtitle generating apparatus of claim 8, in which one or more of said computer processors is adapted to:
set a maximum length for a line of subtitle text;
and divide the remaining script text at the last breakable point in the remaining script text whose position precedes the position in the remaining script text equal to the maximum length of line of subtitle text.

10. The subtitle generating apparatus of claim 8, in which one or more of said computer processors is adapted to:
classify the pause as a short pause or a long pause according to whether the pause exceeds a predetermined threshold duration;
define a breakable point where a pause is classified as a short pause, and define a break point where a pause is classified as a long pause; and
divide the remaining script text at the next break point in the remaining script text.

11. The subtitle generating apparatus of claim 8, in which one or more of said computer processors is adapted to:
detect corresponding features by detecting punctuation at the end of subtitle lines of text in the first language within the script text in the second language.

12. A tangible non-transitory computer program product comprising processor instructions that when implemented cause one or more computer processors to carry out steps comprising:
obtaining an audio file of dialogue in a first language;
obtaining a file of script text corresponding to the dialogue in the audio file in the same first language;
determining a timing correspondence between dialogue in the audio file and words in the script text;
detecting at least a first pause during performance of the dialogue in the audio file;
defining a respective breakable point in the script text corresponding to the or each detected pause;
dividing the script text out into a sequence of subtitle lines of text responsive to the location of one or more of the defined breakable points;
obtaining a file of script text corresponding to the dialogue in the audio file in a different second language;
obtaining the sequence of subtitle lines of text divided out of the script text of the first language, the sequence comprising a characteristic number of lines;
detecting corresponding features of the text between both languages;
dividing the script text in the second language into a sequence of subtitle lines of text having the same characteristic number of lines, the points of division being responsive to the correspondence of features of the text between both languages; and
outputting the sequence of subtitle lines of text for presentation on a display device.

* * * * *